(12) United States Patent
Lowry et al.

(10) Patent No.: US 11,930,290 B2
(45) Date of Patent: Mar. 12, 2024

(54) PANORAMIC PICTURE IN PICTURE VIDEO

(71) Applicant: COSM, INC., Dallas, TX (US)

(72) Inventors: Brian C. Lowry, Emlenton, PA (US);
Joseph B. Tomko, Wexford, PA (US);
Evan A. Wimer, Pittsburgh, PA (US)

(73) Assignee: COSM, INC., Dallas, TX (US)

( * ) Notice: Subject to any disclaimer, the term of this patent is extended or adjusted under 35 U.S.C. 154(b) by 0 days.

(21) Appl. No.: 16/963,738

(22) PCT Filed: Jan. 21, 2019

(86) PCT No.: PCT/US2019/014417
§ 371 (c)(1),
(2) Date: Jul. 21, 2020

(87) PCT Pub. No.: WO2019/144076
PCT Pub. Date: Jul. 25, 2019

(65) Prior Publication Data
US 2021/0084254 A1    Mar. 18, 2021

Related U.S. Application Data

(60) Provisional application No. 62/620,218, filed on Jan. 22, 2018.

(51) Int. Cl.
*H04N 5/45* (2011.01)
*H04N 5/262* (2006.01)
(Continued)

(52) U.S. Cl.
CPC ............ *H04N 5/45* (2013.01); *H04N 5/2624* (2013.01); *H04N 21/21805* (2013.01);
(Continued)

(58) Field of Classification Search
CPC ......... H04N 21/21805; H04N 21/4316; H04N 21/4858; H04N 5/23238; H04N 5/23299; H04N 5/2624; H04N 5/45; H04N 5/265
See application file for complete search history.

(56) References Cited

U.S. PATENT DOCUMENTS 7,496,277 B2 *  2/2009  Ackley ................. G11B 27/34
                                                386/230
8,970,666 B2 *  3/2015  DiGiovanni ... H04N 21/234345
                                                700/91
(Continued)

OTHER PUBLICATIONS

Young, Lee W., International Search Report for PCT Application Serial No. PCT/US2019/014417, dated Mar. 25, 2019, 2 pages, Alexandria, Virginia.

*Primary Examiner* — Jessica M Prince
(74) *Attorney, Agent, or Firm* — Ference & Associates LLC (57) ABSTRACT

One embodiment provides a method, including: capturing, from each of at least two cameras, video from a vantage point of an event; generating an immersive video stream from the video captured by the at least two cameras; producing a transport video stream by combining the immersive video stream with a production camera video stream, wherein the transport stream is available for user consumption and providing, to a display device, a streamed production to a user, wherein the streamed production comprises the immersive video stream and the production camera video stream, the streamed production comprising an overlay window comprising at least one of the immersive video stream and the production camera video stream and a primary view comprising at least one of the immersive video stream and the production camera video stream.

20 Claims, 4 Drawing Sheets

(51) Int. Cl.
*H04N 21/218* (2011.01)
*H04N 21/431* (2011.01)
*H04N 21/485* (2011.01)
*H04N 23/695* (2023.01)
*H04N 23/698* (2023.01)

(52) U.S. Cl.
CPC ..... *H04N 21/4316* (2013.01); *H04N 21/4858* (2013.01); *H04N 23/695* (2023.01); *H04N 23/698* (2023.01)

(56) References Cited

U.S. PATENT DOCUMENTS

| | | | |
|---|---|---|---|
| 9,185,361 B2 * | 11/2015 | Curry | H04N 7/181 |
| 9,781,356 B1 * | 10/2017 | Banta | H04N 5/2628 |
| 10,277,813 B1 * | 4/2019 | Thomas | H04N 23/90 |
| 2002/0147991 A1 * | 10/2002 | Furlan | H04N 7/088 |
| | | | 348/42 |
| 2015/0289032 A1 * | 10/2015 | Vermolen | H04N 21/41407 |
| | | | 725/74 |
| 2018/0025751 A1 * | 1/2018 | Patel | G06F 3/04847 |
| | | | 715/723 |
| 2019/0394375 A1 * | 12/2019 | Barnich | H04N 5/77 |

* cited by examiner

PANORAMIC PICTURE IN PICTURE VIDEO

CLAIM FOR PRIORITY

This application claims priority to U.S. Provisional Patent Application Ser. No. 62/620,218, filed on Jan. 22, 2018, entitled "PANORAMIC PICTURE IN PICTURE VIDEO", the contents of which are incorporated by reference herein.

BACKGROUND

Picture-in-Picture (PIP) describes any technology that allows the viewing of multiple, simultaneous video programs. PIP technology was conceived in the 1970's, existing first as a tool for broadcasters, and later making its way to consumer devices. With the advent of digital technology in the 1990's, PIP became less costly and ubiquitous in both television sets and Set Top Boxes (STB's). Today, modern digital televisions have the capability to simultaneously display multiple video programs, derived from both internet protocol (IP) streams, as well as digital Over-the-Air (OTA)—a/k/a "terrestrial" radio-frequency broadcasts.

BRIEF SUMMARY

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A panoramic video environment is defined as a virtual experience, viewed on personal computers, mobile devices, virtual reality headsets or "goggles," "smart" televisions, etc., where the user views a panorama from a first person perspective relative to the camera that is capturing the video. The "view" may be a two-dimensional "portal" into the panoramic environment, or a stereoscopic view (three dimensional view). The panorama is typically 3600 in one plane (azimuth), and varying from 50°-360° in the orthogonal plane (altitude). The user will typically have directional control in the view portal, including the ability to pan, tilt, and zoom from the perspective of the camera Panoramic or immersive video is becoming increasingly popular, particularly on social media web sites such as Facebook®, YouTube®, and Twitter®. Facebook is a registered trademark of Facebook, Inc. YouTube® is a registered trademark of Google, Inc. Twitter® is a registered trademark Twitter, Inc.

Unlike a traditional, or "flat" (planar) video, panoramic video permits the user to pan, tilt, and zoom (PTZ) in the immersive environment, thus creating a personalized, first-person experience in contrast with the curated broadcast view. Embodiments provide that, while viewing the stream, the user may pan, tilt, and zoom the view in an immersive environment. It should be understood that the user would not be controlling the camera capturing the stream. Rather, because the video stream is captured as a panoramic view, the user is able to manipulate the view within the stream. In other words, while the video stream is captured in panoramic, a user only sees a portion of the panoramic stream at a single time, referred to herein as a view. Therefore, the user is able to provide commands (e.g., tilt, pan, zoom, etc.) to see a different portion, or view, of the panoramic stream.

Many camera systems exist today that are able to capture and store immersive video for publication on social media web sites. More sophisticated systems likewise exist that allow live events to be "streamed" to the social media sites for viewing in real time (also known as "live"). These cameras capture a very large field of view, typically 180°× 360°—a hemisphere, or 360°×360°—a full sphere.

Broadcasters routinely create PIP experiences during production, having multiple camera feeds from numerous angles, vantage points, and points-of-view, etc. However, there is no way in which a broadcast or live stream viewer could interact with any of the video sources that comprise the broadcast. The camera views are deterministic, being specified at the time of production.

What is needed in the industry is the ability to combine aspects of PIP technology—simultaneously viewing multiple video programs—with immersive camera viewing technology, in which the end user/viewer may choose from one or more cameras, as well as their view from that camera by means of PTZ control, thus merging the benefits of the high-quality production broadcast with user's personal viewing preferences.

An embodiment provides a method comprising: capturing, using two or more cameras, at least one of which is panoramic, video from high value, interesting, or unusual vantage points (desirable vantage points), and creating a multiplexed stream, for consumption on a suitably-equipped television, personal computer (PC), mobile phone, or head-mount display (HMD), allowing the user/viewer the ability to interact with at least one of the camera views in such a way so as to change their view from the perspective of that camera.

In another embodiment, the immersive cameras may be connected to a workstation which contains a frame grabber which ingests the video frames from two or more cameras simultaneously and transfers them to a graphics processing unit (GPU) for processing.

Various video pipeline operations are performed on the GPU, including debayering (demosaicing), noise reduction, color correction, and the like. Following this stage, the video images are mathematically transformed to yield an industry-standard projection, such as equirectangular. This procedure is performed on a frame-by-frame basis, typically at the rate of thirty to sixty frames per second.

The camera views ingested by the workstation may be processed individually, or composited to form a single projection as taught in U.S. Provisional Application No. 62/571,876 entitled "Creating Multi-Camera Panoramic Projections", filed on Oct. 13, 2017, attached as an Appendix, the contents of which are fully incorporated by reference herein. The final projection may then be encoded with an industry standard codec, such as H.264 or HEVC (High Efficiency Video Coding). H.264 or MPEG-4 Part 10, Advanced Video Coding (MPEG-4 AVC) is a block-oriented motion-compensation-based video compression standard. H.264 It is a commonly used format for the recording, compression, and distribution of video content. Finally, the encoded video frames are streamed via the workstation network interface card.

In addition to providing immersive camera streams, Serial Digital Interface (SDI) outputs may be routed to a broadcast backhaul. SDI is the SMPTE (Society of Motion Picture and Television Engineers) standard for the transmission of video and audio in a broadcast environment. These video frames may be composited with the production video, during the production pipeline operations, such that a PIP view of the immersive camera is shown as an overlay on the video production.

On the broadcast side, one or more cameras are used to capture the live event. These cameras feed into a production switcher/router (backhaul) which allows the event producer, in real time, to choose which cameras are "aired". The production signal proceeds through the pipeline, where graphics, scores, game clocks, and the like are overlayed ("keyed") onto the video.

Thereupon, the video is packaged for transport. In the case of OTA (over the airway) transmission, a DVB (Digital Video Broadcasting) MPEG-2 TS (Transport Stream based upon standards set by the MPEG (Moving Picture Expert Group) is often employed. For internet streaming, the video signal is typically encoded with H.264 or HEVC, then relayed via Real Time Messaging Protocol (RTMP) or some other suitable transport stream.

An embodiment provides that injecting a multiplexer, at the broadcast site, after the encoding process, allows us to combine multiple elementary streams. Thus, the live production stream may be combined with the immersive camera streams, yielding a single transport stream directed to the cloud for consumption. This transport stream, thus, contains multiple elementary streams—one for the production video stream, and one or more for each of the immersive camera streams.

An OTT (Over the Top) provider's contribution encoder ingests the transport stream, and then disseminates to a scalable number of viewers, using various protocols (e.g, HLS, MPEG-DASH, and the like), using resolutions and codecs appropriate for the end-users' devices, which may include personal computers, mobile phones, head-mounted displays, and the like.

End users watching the streamed production in a streaming player application, have the ability, by clicking on an icon or some type of user-interface (UI) indicator, or the PIP itself, to change their view according to one of the following non-limiting scenarios:

(I) The immersive view may become the primary view, allowing the user to interact as described above. The production view may become the PIP;

(II) The immersive view may populate the entire screen without displaying a PIP window. A keystroke or clicking on an icon might return the user to the primary view; or (III) The immersive PIP window may be selected from amongst several choices based upon the user's preferences. As taught in U.S. Patent Pub. No. 2016/0173775, positional data of objects of interest may be packaged as metadata with each immersive camera video frame. In cases where such metadata is available, that data may be used to provide PIP alternatives for the user. For example, one user may prefer to watch the goalies, while another may prefer to follow the ball.

The variations in how the two streams may be displayed are dictated by the design of the player application software. Thus, the examples above are non-limiting, but serve to conceptually demonstrate one means of realizing what is described in this disclosure.

In another embodiment the production stream and immersive streams are not multiplexed on site, but on cloud-based servers. In this scenario, the broadcaster encodes and streams the production feed independently of the immersive camera feed(s). The cloud-based contribution encoder multiplexes the multiple streams and makes the resultant stream available for mass consumption. In this embodiment, the PIP, as seen by the user/viewer, may be a window drawn by the software player application, rather than a part of the broadcast stream. As such, there is far greater flexibility in the manner in which the PIP can be visually displayed. For example, the PIP window may be static or may move dynamically, or it may be moved and/or resized by the user. This additional flexibility adds to the overall user-controlled experience.

Alternatively, the user may elect to "auto track" a device. In this scenario, positional data for objects of interest (e.g., a player) are packaged and transmitted with the stream, allowing the user to select that object of interest, then have the viewing application automatically adjust the gaze direction per the location of the object of interest in the panorama as taught in U.S. Patent Pub. No. 2016/0173775.

The description now turns to the figures. The illustrated embodiments of the invention will be best understood by reference to the figures. The following description is intended only by way of example and simply illustrates certain example embodiments.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
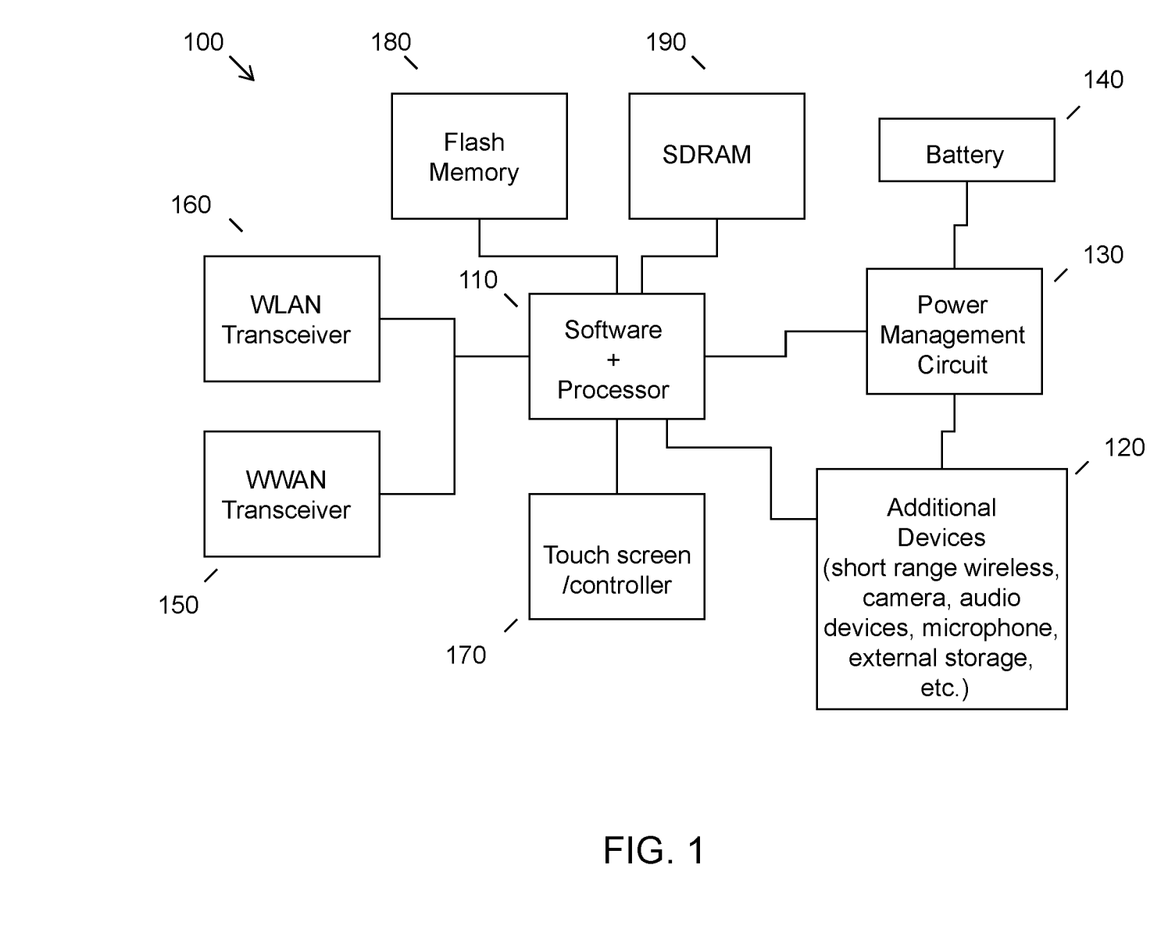
FIG. 1 illustrates an example information handling device.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
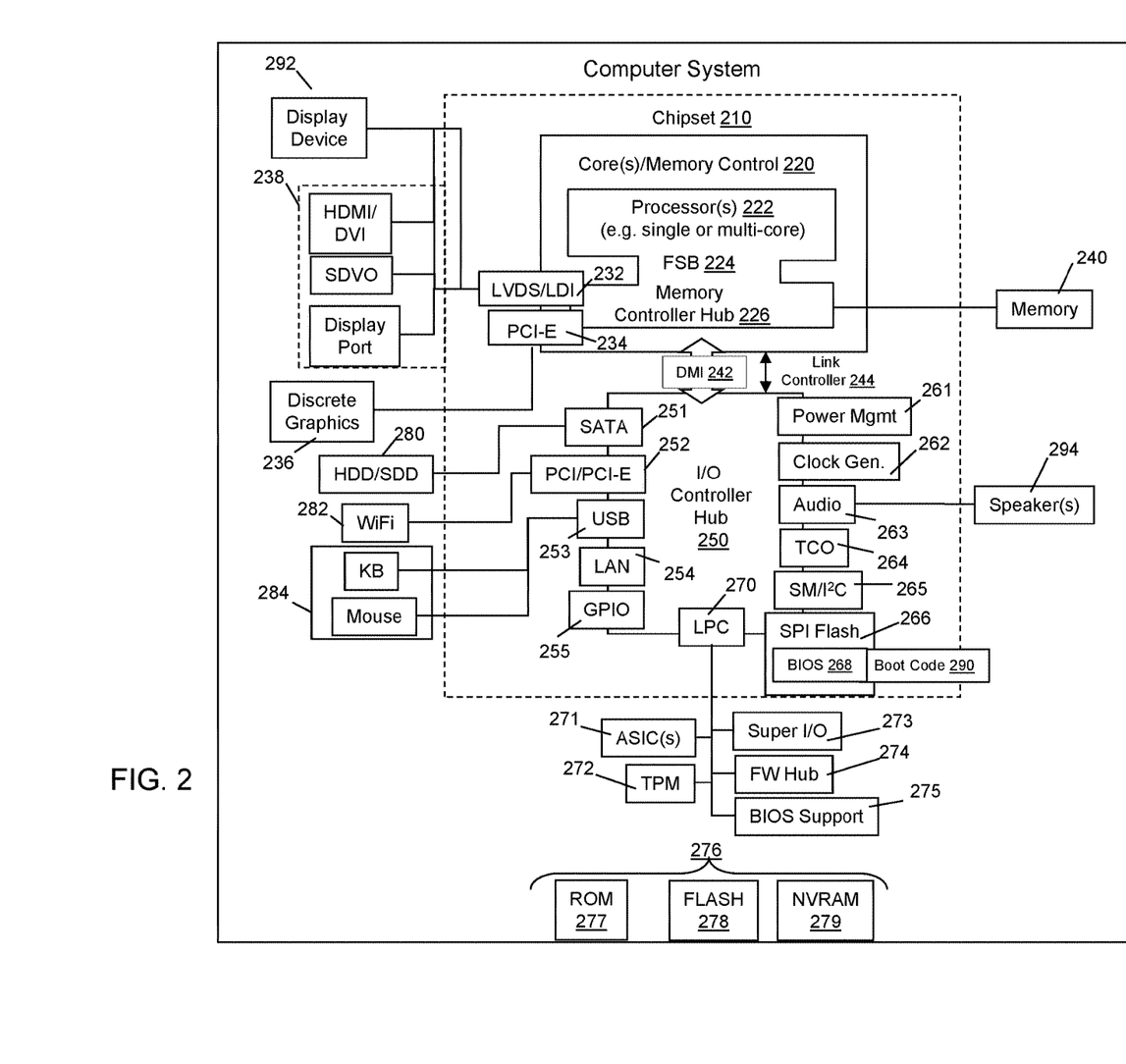
FIG. 2 illustrates an example information handling system.

FIG. 2 depicts a block diagram of another example of information handling device circuits, circuitry or components. The example depicted in FIG. 2 may correspond to computing systems such as the THINKPAD® series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279) a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which enable users to communicate with a digital assistant. For example, the circuitry outlined in FIG. 1 may be implemented in a tablet or smart phone embodiment, whereas the circuitry outlined in FIG. 2 may be implemented in a personal computer embodiment.

Figure 3:
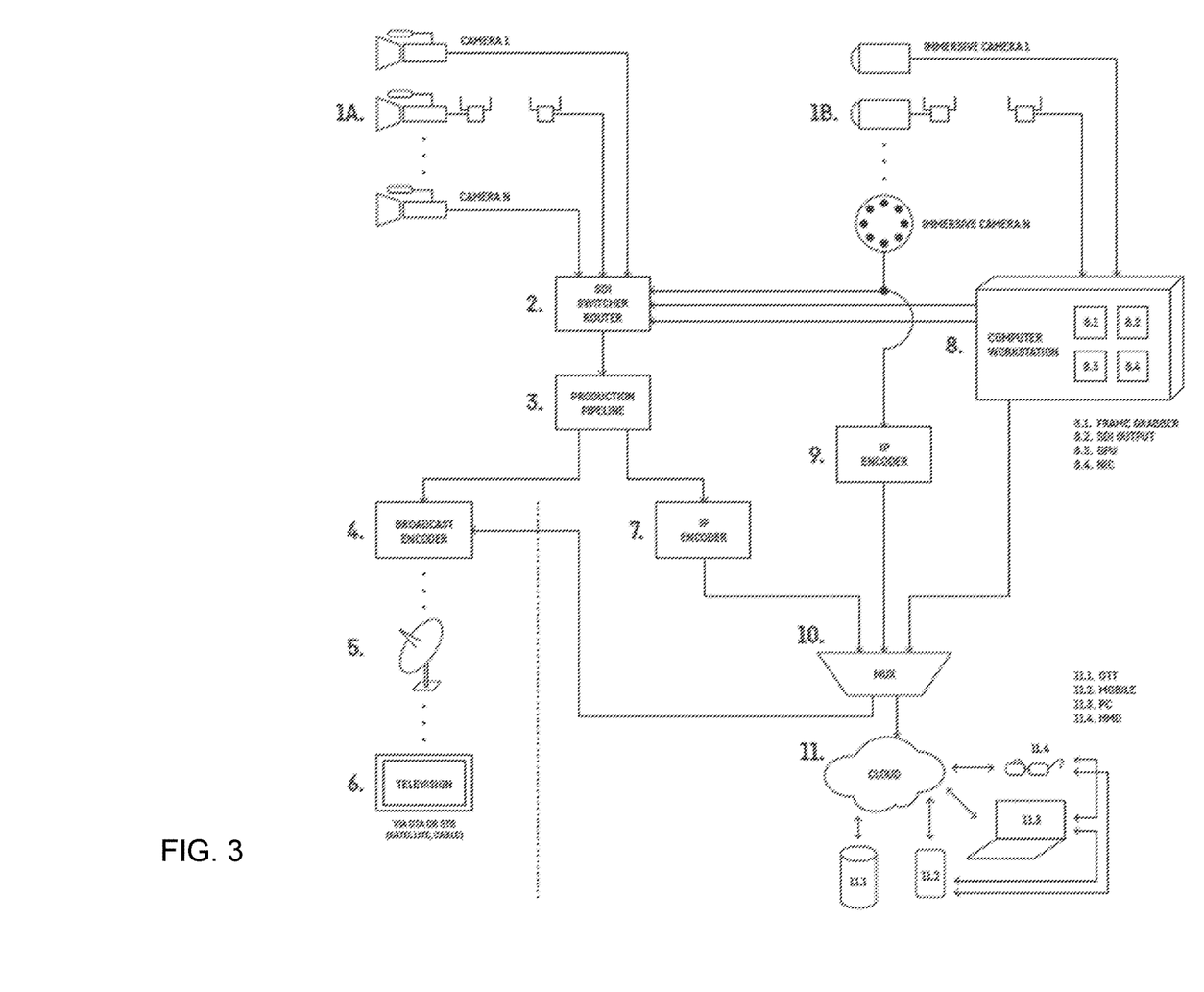
FIG. 3 illustrates an example embodiment.

Referring now to FIG. 3, provided is a non-limiting example embodiment in the context of broadcasting a soccer match. On the field are two opposing nets in which are located two inward-facing immersive cameras (1B). Also capturing the event are traditional broadcast cameras (1A), with much narrower fields of view. Traditional broadcast cameras are used to capture a side view of the entire field, and wireless cameras are used for on-the-field and sideline shots where a mobile point-of-view (POV) is advantageous. The traditional cameras utilize SDI technology to transmit signals of varying resolutions to the production backhaul at (2). The backhaul at (2) may consist of numerous routers and switching devices though only one SDI SWITCHER ROUTER is shown in FIG. 3 for clarity. The matrix of cameras (1A and 1B) is available to the broadcast producer and production staff. The production pipeline (3) is used to augment the camera selection with replays, audio, transitions, graphic overlays such as the score and game clock, and the like. It is in this stage, in at least one embodiment, that one or more PIP windows may be drawn, overlaying the primary broadcast video. This may be done via a ganging of powerful graphics workstations, graphics processors, and software, with operators managing the workflow. One non-limiting example of such a system is the CHYRONHEGO® LIVE COMPOSITOR system. CHYRONHEGO is a registered trademark of ChyronHego Corporation of New York. Other such systems are available and would be equally useful.

In one example embodiment, each immersive camera (1B) captures a horizontal field of view (HFOV) and vertical field of view (VFOV) of 180°—a full hemisphere. An example of such a cameras might be an IO Industries Flare 48M30CCX-A with a short focal length "fisheye" lens, such as the Canon 8-15 mm f4 USM L. The cameras may communicate with a remote workstation (8), typically located in a production truck that can be 1-10 km from the location of the cameras.

In the present embodiment, the remote workstation (8) is a custom-built unit from Next Computing, Inc. comprising an ASUS® X99-E Mainboard with an Intel® Xeon-E5 Processor having 16 GB DDR4-2133 MHz-non ECC RAM with an 850 W Power Supply running Microsoft Windows 10-Pro 64 Bit operating system. The frame grabber is a Komodo Kaya FXP, manufactured by Kaya Instruments. ASUS® is a registered trademark of Asustek Computer Incorporation of Taiwan. INTEL® is a registered trademark of Intel Corporation of Delaware.

The communication of the multiplexed video may be accomplished by utilizing one or more 10 Gbs fiber optic links, as is common in the industry. The fiber links connect to a frame grabber card (8.1) located in the remote workstation (8). In the present embodiment, the frame grabber is a Komodo Kaya FXP, manufactured by Kaya Instruments. The frame grabber (8.1) driver, along with custom software, allows for the direct transfer of video frames from the frame grabber memory to the graphics processing unit (GPU—8.3. The GPU (8.3) is specifically designed to process video frames at high rates, whereas the workstation central processing unit (CPU) is designed for more general purpose tasks. Thus, the objective is to transfer video frames from the frame grabber (8.1) to the GPU (8.3) with as little CPU intervention as possible, as this would degrade performance.

One embodiment describes having only two cameras connected to the workstation. This is a non-limiting embodiment, since the workstation may contain multiple frame grabbers, each connected to multiple cameras. The practical limitations to the number of cameras are dictated by the state of the art of both computers and their buses. In the case of modern computers, the standard bus interface is PCI (Peripheral Connect Interconnect), and its derivatives—PCIe (PCI-Express). The PCI bus standard continues to evolve, with each iteration increasing the number of "lanes" resulting in a greater number of Gigabytes per second, thus facilitating the transfer of video frames at a greater rate.

Once video frames are pushed to the GPU (8.3) memory, they can be manipulated. Typical operations are debayering (demosaicing), denoising, white balance adjustment, the application of 3D LUTs (Look-Up Tables) used for color correction, and the like. These video pipeline operations are required to improve the video quality for adherence to professional video standards. These video pipeline operations are performed in custom software optimized for GPU processing. The present example embodiment uses GPUs manufactured by NVIDIA company, specifically the GeForce 1080 Ti, a registered trademark of NVIDIA company, and employs software and libraries written in CUDA—NVIDIA's proprietary processing language CUDAV, a registered trademark of NVIDIA company. This language harnesses the massively parallel processing architecture of the GPU.

The next operations on the GPU (8.3) consist of transformational operations. These transformational operations may be used to create a composited projection that may be encoded and streamed as is taught in U.S. Provisional Patent Application No. 62/571,876 entitled "Creating Multi-Camera Panoramic Projections". For a single camera system, where the fisheye lens forms a circular image on the full frame camera sensor, the captured circular frames are transformed in software into an equirectangular, or a portion of an equirectangular, projection. For a hemispherical camera, the circle will map (transform) into one half of an equirectangular projection. The mathematical transform maps pixels in the source video frame (oval) to the equirectangular video frame. There is nothing limiting in this invention concerning the specific composited projection type. Equirectangular is the de facto standard at the writing of this disclosure. Other projections, such as cube map, and equi-angular cube map, are becoming increasingly popular. For the purposes of this disclosure, we will continue to use the equirectangular projection.

After creating each camera projection, or composited projection, each video frame is encoded. Video may be encoded using the H.264 or HEVC codecs for video transmission. Other codecs may be used to obtain desirable quality. This is performed on ASICs built in to the GPU. Thereafter, the video frames may be sent to the NIC (network interface card) (8.4), being converted to an Internet Protocol (IP) stream and packaged suitably for transport to the internet (11), typically being connected via a CAT6 patch cable, fiber optic link, or wireless transmission.

Other off-the-shelf immersive cameras may be employed that do not require the processing done on workstation (8). A non-limiting example would be the Nokia OSO. These cameras typically produce SDI (Serial-Digital Interface) video output, or other common video outputs such as HDMI. In such cases, the output from these devices must be encoded by a standalone device (9).

Returning to the description of the production router/switcher (2), we show in FIG. 3 that in addition to the traditional cameras, the immersive cameras views are also available for "airing" in production. However, it should be noted that typically it is not the entire panoramic view, but only a portion of the view, that is ingested, as the full panorama can be quite distorted. An operator located at the workstation (8) may utilize a joystick or other means to create unique PTZ views which are then converted to standard SDI broadcast signals via a SDI output computer card (8.2) within the workstation. The number of unique SDI outputs from the workstation is a practical limitation of the type of SDI card (8.2) employed, as well as the processing power of the workstation (8), and is not correlated with the number of cameras. In principal, the number of unique PTZ views from each immersive camera is essentially infinite.

In the embodiment shown in FIG. 3, SDI video frames from the immersive cameras may be used in the broadcast production to create a PIP window, using video compositing techniques well known in the industry. In our example of a soccer match, the traditional cameras are capturing the action on the entire field, with occasional "close-ups" of the players, while the immersive cameras are capturing video in both nets. The broadcast video could then show the field view as the primary view, with two PIPs of each net. When watching the match on a home computer (11.3), mobile phone (11.2), or Head Mount Display (11.4), the user may click on either PIP and activate the secondary or tertiary stream, thus placing them in a first person perspective from the vantage point of that camera, allowing them to PTZ.

In an embodiment, the various streams are routed to a multiplexer (10)—the "aired" video stream as well one or more immersive camera streams. The multiplexer (MUX) is a workstation or appliance that is capable of ingesting multiple simultaneous elementary streams, each with audio and video, and creating a transport stream containing a plurality of elementary streams. The MUX (10) has FIFO buffers for ingesting and synchronizing the incoming IP packets. Typically, there is a latency incurred at this point. The transport stream is then directed to an OTT (over the top) provider (11.1) that has the capability of transcoding the contribution stream and disseminating it to a large audience. One concern with combing multiple streams is the resultant bandwidth requirement. However, with modern codecs such as HEVC, as compared to H.264, it is possible to encode a stream to operate at a substantially lower bitrate while preserving the same quality. Thus, by employing modern codecs, this invention may be realized without appreciably increasing bandwidth.

In a second embodiment, the MUX (10) is cloud-based. In this embodiment, the PIP functionality may be dynamically constructed in software, rather than in broadcast production. This is a preferred embodiment for several reasons. First, it lowers broadcast costs and complexities. Secondly, it affords the rights owner(s) the opportunity to upcharge and monetize the immersive camera streams. Thirdly, it provides the OTT operator an opportunity to "strip" away the immersive streams for the case of streaming to users with insufficient bandwidth, or to create separate program streams. Fourthly, it enhances the end-user/viewer experience by allowing the PIP window(s) on the user's player software application to be dynamic and user-configurable. As an example, one user may choose not to view PIPs, and can turn this functionality off such that the OTT stream will be unbundled and contain only the streamed broadcast. Another user may want to resize their PIP(s) because the immersive camera views are more interesting than the broadcast stream. There are interesting social networking aspects of the immersive PIPs; users can share their PTZ and stream information with other users as taught in Publication Number WO2017161287 entitled "Share Experiences in Panoramic Video".

In addition to distributing the immersive PPs for cloud-based streaming applications, it is also possible to distribute the signal via satellite (5) to STB's and smart televisions (6) via OTA and cable. In this embodiment, a custom application on a STB or smart television would allow the selection of the PIP(s), as well as the navigation in the immersive video, via a remote control or mobile device used as a proxy for controlling the STB or smart television.

Figure 4:
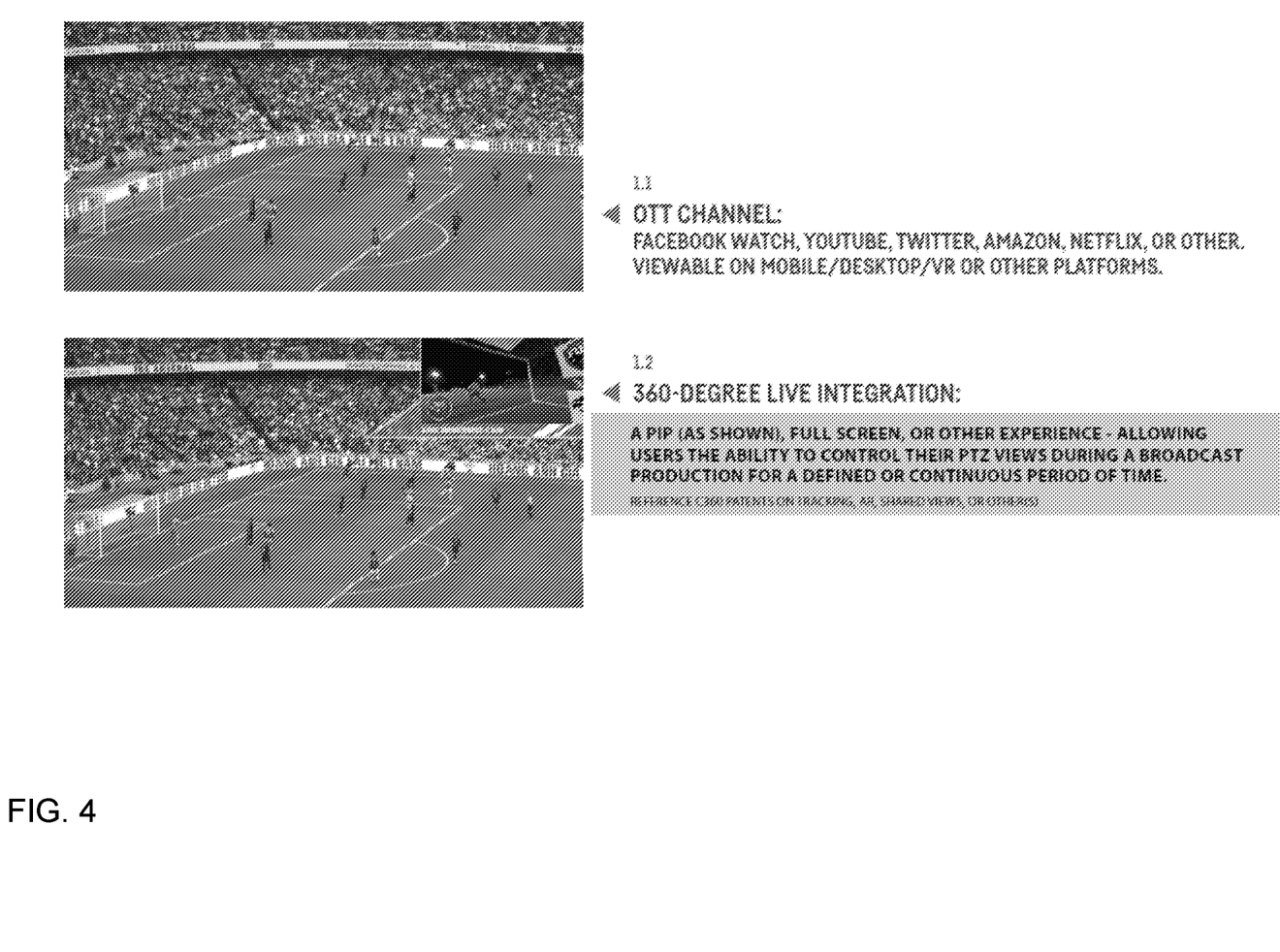
FIG. 4 illustrates an example embodiment.

Referring now to FIG. 4, a non-limiting example embodiment is provided. This upper figure depicts the broadcast output (1.1) which may be streamed to the internet for viewing. It should be understood that this is merely a captured frame of the continuous video program. The lower figure (1.2) depicts the same production output overlayed with an immersive PIP window. The immersive PIP video frames update synchronously with the production video frames. The user may select the PIP window, thereby entering into a mode whereby they may elect to change their PTZ. In this non-limiting example, one PIP window is shown. The number of PIP windows corresponds to the number of immersive cameras as well the available bandwidth in which to stream the multiple steams.

It will be appreciated by those skilled in the art that embodiments provided herein are equally applicable to various sports and other events where multiple cameras and views are desirable.

While the various example embodiments have been described in connection with the examples provided herein, these were provided as non-limiting examples. Accordingly, embodiments may be used in similar contexts with similar devices and methods.

It will also be understood that the various embodiments may be implemented in one or more information handling devices configured appropriately to execute program instructions consistent with the functionality of the embodiments as described herein. In this regard, FIG. 1 and FIG. 2 illustrate a non-limiting examples of such devices and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is a non-transitory storage medium, inclusive of all storage media other than signal or propagating media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, from each of at least two cameras, video from a vantage point of a live event;
    generating, in real time as the live event is occurring and from the video captured by the at least two cameras, an immersive video stream allowing an end user to manipulate, while viewing the immersive video stream streamed to the end user and in real time as the live event is occurring, a portion of the immersive video stream viewed by the end user, wherein the manipulating the portion does not control the at least two cameras capturing the video;
    producing a transport video stream by combining the immersive video stream with a production camera video stream comprising video of the live event produced and provided in real time as the live event is occurring, wherein the transport stream is available for user consumption, wherein the producing a transport video streams comprises combining, via multiplexing, multiple elementary video streams into a single transport stream comprising a plurality of discrete individual video streams, wherein at least one of the plurality of discrete individual video streams comprises the immersive video stream and wherein at least another of the plurality of discrete individual video streams comprises the production camera video stream; and
    providing, to a display device, a streamed production to the end user from the transport video stream, wherein the streamed production comprises displaying each of the immersive video stream and the production camera video stream as separate, simultaneous video streams on the display device, the streamed production comprising an overlay window comprising at least one of the immersive video stream and the production camera video stream and a primary view comprising at least one of the immersive video stream and the production camera video stream, wherein the end user provides input to manipulate the immersive video stream and change the portion of the immersive video stream being viewed by the end user in real time as the live event is occurring.

2. The method of claim 1, wherein each of the at least two cameras captures video from a vantage point different than the other of the at least two cameras.

3. The method of claim 1, wherein at least one of the at least two cameras comprises a panoramic camera.

4. The method of claim 1, wherein the production camera video stream is selected from more than one production camera video stream.

5. The method of claim 1, wherein streamed production is streamed to the end user during real-time occurrence of the event.

6. The method of claim 1, wherein the immersive video stream provides a first-person, panoramic point-of-view to the end user.

7. The method of claim 6, wherein manipulating the portion of the immersive video stream comprises at least one effect selected from the group consisting of: panning, tilting, and zooming.

8. The method of claim 6, wherein the point-of-view dynamically changes to track an object selected by the end user.

9. The method of claim 1, wherein the generating an immersive video stream comprises generating a panoramic video stream by ingesting the video captured by the at least two cameras simultaneously and composited to form a single projection.

10. The method of claim 1, wherein the overlay window comprises at least one picture-in-picture window projecting a user selected immersive video stream point-of-view.

11. The method of claim 10, wherein the picture-in-picture window comprises dynamic parameters selected from the group consisting of: position within the streamed production and size of the picture-in-picture window.

12. The method of claim 11, wherein the dynamic parameters are selected by at least one of: the end user and a software application associated with the display device displaying the streamed production.

13. A system, comprising:
    at least two cameras;
    a processor; and
    a memory device that stores instructions executable by the processor to:
    capture, from each of the at least two cameras, video from a vantage point of a live event;
    generate, in real time as the live event is occurring and from the video captured by the at least two cameras, an immersive video stream allowing an end user to manipulate, while viewing the immersive video stream streamed to the end user and in real time as the live event is occurring, a portion of the immersive video stream viewed by the end user, wherein the manipulating the portion does not control the at least two cameras capturing the video;
    produce a transport video stream by combining the immersive video stream with a production camera video stream comprising video of the live event produced and provided in real time as the live event is occurring, wherein the transport stream is available for user consumption, wherein the producing a transport video streams comprises combining, via multiplexing, multiple elementary video streams into a single transport stream comprising a plurality of discrete individual video streams, wherein at least one of the plurality of discrete individual video streams comprises the immersive video stream and wherein at least another of the plurality of discrete individual video streams comprises the production camera video stream; and provide, to a display device, a streamed production to the end user from the transport video stream, wherein the streamed production comprises each of the immersive video stream and the production camera video stream displayed as separate, simultaneous video streams on the display device, the streamed production comprising an overlay window comprising at least one of the immersive video stream and the production camera video stream and a primary view comprising at least one of the immersive video stream and the production camera video stream, wherein the end user provides input to manipulate the immersive video stream and change the portion of the immersive video stream being viewed by the end user in real time as the live event is occurring.

14. The system of claim 13, wherein at least one of the at least two cameras comprises a panoramic camera.

15. The system of claim 13, wherein the immersive video stream provides a first-person, panoramic point-of-view to the end user.

16. The system of claim 15, wherein the point-of-view dynamically changes to track an object selected by the end user.

17. The system of claim 13, wherein the generating an immersive video stream comprises generating a panoramic video stream by ingesting the video captured by the at least two cameras simultaneously and composited to form a single projection.

18. The system of claim 13, wherein the overlay window comprises at least one picture-in-picture window projecting a user selected immersive video stream point-of-view.

19. The system of claim 18, wherein the picture-in-picture window comprises dynamic parameters selected from the group consisting of: position within the streamed production and size of the picture-in-picture window.

20. A product, comprising:
a storage device that stores code, the code being executable by a processor and comprising:
code that captures, from each of the at least two cameras, video from a vantage point of a live event;
code that generates, in real time as the live event is occurring and from the video captured by the at least two cameras, an immersive video stream allowing an end user to manipulate, while viewing the immersive video stream streamed to the end user and in real time as the live event is occurring, a portion of the immersive video stream viewed by the end user, wherein the manipulating the portion does not control the at least two cameras capturing the video;
code that produces a transport video stream by combining the immersive video stream with a production camera video stream comprising video of the live event produced and provided in real time as the live event is occurring, wherein the transport stream is available for user consumption, wherein the producing a transport video streams comprises combining, via multiplexing, multiple elementary video streams into a single transport stream comprising a plurality of discrete individual video streams, wherein at least one of the plurality of discrete individual video streams comprises the immersive video stream and wherein at least another of the plurality of discrete individual video streams comprises the production camera video stream; and
code that provides, to a display device, a streamed production to the end user from the transport video stream, wherein the streamed production comprises each of the immersive video stream and the production camera video stream displayed as separate, simultaneous video streams on the display device, the streamed production comprising an overlay window comprising at least one of the immersive video stream and the production camera video stream and a primary view comprising at least one of the immersive video stream and the production camera video stream, wherein the end user provides input to manipulate the immersive video stream and change the portion of the immersive video stream being viewed by the end user in real time as the live event is occurring.

* * * * *